United States Patent
Zhang et al.

(10) Patent No.: US 7,357,956 B2
(45) Date of Patent: Apr. 15, 2008

(54) TEA BEVERAGE WITH IMPROVED FLAVOR

(75) Inventors: Shi-Qiu Zhang, Tenafly, NJ (US); Donald Joseph Hamm, New Providence, NJ (US); John William Tobin, Hillsdale, NJ (US)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 437 days.

(21) Appl. No.: 10/726,718

(22) Filed: Dec. 3, 2003

(65) Prior Publication Data

US 2005/0123660 A1 Jun. 9, 2005

(51) Int. Cl.
*A23B 5/14* (2006.01)

(52) U.S. Cl. .................... 426/597; 426/321; 426/330.3; 426/335; 426/654; 426/656

(58) Field of Classification Search ................ 426/597, 426/654, 656, 321, 330.3, 335
See application file for complete search history.

(56) References Cited

U.S. PATENT DOCUMENTS

| | | | |
|---|---|---|---|
| 5,324,716 A * | 6/1994 | Selsted et al. ................ 514/14 |
| 5,773,063 A | 6/1998 | Knueven | |
| 5,958,491 A | 9/1999 | Knueven et al. | |
| 6,096,365 A | 8/2000 | Spisak et al. | |
| 6,132,792 A | 10/2000 | Knueven et al. | |
| 6,268,009 B1 | 7/2001 | Ekanayake et al. | |
| 6,423,361 B1 * | 7/2002 | Lehmberg et al. ........... 426/597 |
| 6,620,445 B1 | 9/2003 | Knueven | |
| 7,060,301 B2 * | 6/2006 | Wei et al. .................... 424/616 |
| 2003/0134017 A1 | 7/2003 | Graumlich et al. | |
| 2006/0275506 A1 * | 12/2006 | Fisher et al. ................ 424/641 |

FOREIGN PATENT DOCUMENTS

| | | |
|---|---|---|
| EP | 0 075 429 A | 3/1983 |
| EP | 1 026 956 | 9/2002 |
| GB | 485 722 A | 5/1938 |
| WO | 03/032741 A1 | 4/2003 |

OTHER PUBLICATIONS

International Search Report on International Application No. PCT/EP 2004/012905 dated Feb. 21, 2005.
Written Opinion of International Searching Authority.
Database WPI, Section Ch, Week 200120, Derwent Publication Ltd., AN 2001-192207 XP002315839 & CN 1274544A.
Article from Food Product Design, Sep. 2003, p. 87.
Article from Food Product Design, Nov. 2003, *New Acidulant Offers a Mellow Option*, p. 71.
Article from Food Product Design, Mar. 2004, *Acidulation Enters a New Phase*, p. 108.
Article from Food Product Design, Dec. 2004, *Acidulant Cuts Sweetener Use*, p. 111.

* cited by examiner

*Primary Examiner*—Helen F Pratt
(74) *Attorney, Agent, or Firm*—Edward A. Squillante, Jr.

(57) ABSTRACT

The invention is directed to beverages with improved flavor. The beverages are not sour and have a monoprotic acidulant with a pKa of less than about 2.6 and/or a polyprotic acidulant with a $pKa_1$ of less than about 2.6 and a $pKa_2$ of less than about 3 or greater than about 6.

17 Claims, No Drawings

TEA BEVERAGE WITH IMPROVED FLAVOR

FIELD OF THE INVENTION

The primary antimicrobial agent used in this invention (to ensure a microbiologically stable and non-sour tasting beverage) should be suitable for use in a beverage composition. Such an agent, when monoprotic, typically has a pKa of less than about 2.6, and preferably, has a pKa from about −7.0 to about 2.5, and most preferably, from about 1.25 to about 2.5, including all ranges subsumed therein. When polyprotic, the antimicrobial agent typically has a $pKa_1$ of less than about 2.6 and a $pKa_2$ of less than about 3 or greater than about 6. Illustrative non-limiting examples of such antimicrobial agents include sodium bisulfate, potassium bisulfate, ammonium bisulfate, hydrochloric acid, phosphoric acid as well as hydrochlorides glycine alanine, valine, leucine, isoleucine. phenylalanine, asparagine, glutamine, tryptophan, serine, tyrosine, hydroxyproline, cysteine, proline mixtures thereof or the like. It is also within the scope of this invention to employ polypeptides that have backbones and side chains consistent with the above-identified pKa values.

BACKGROUND OF THE INVENTION

The control of microbial proliferation in food and beverage compositions is a continuing concern for manufacturers. Particularly, beverage compositions, when exposed to food spoilage microorganisms, provide an excellent environment for rapid microbial growth.

Manufacturing and packaging operations for minimizing yeast and bacteria proliferation in food and beverage compositions have been developed. Conventional operations, especially in the tea-containing beverage area, use pasteurization or aseptic packaging techniques to minimize beverage spoilage. Such conventional operations, however, do not eliminate the need for low pH products in order to ensure product safety.

Citric acid is the typical acid additive employed in tea-containing beverages to reduce pH. It has been discovered, however, that citric acid has a negative impact on the flavor of tea-containing beverages, especially unsweetened tea containing beverages, which can appear very sour when formulated with citric acid.

Current trends indicate that diets low in carbohydrates are advantageous to consumers concerned with weight management. Thus, there is a need for a tea-containing beverage, especially an unsweetened tea-containing beverage, that has exceptional flavor characteristics. This invention, therefore, is directed to a beverage having improved flavor, even after thermal processing. The beverage of this invention is microbiologically stable notwithstanding the fact that the same is substantially free of citric acid.

Additional Information

Efforts have been disclosed for preparing tea containing beverages. In U.S. Pat. No. 6,096,365, methods for co-extracting tea leaves are described.

Other efforts have been disclosed for preparing beverage compositions. In U.S. Application No. 2003/0134017 A1, beverage compositions with preservatives are described.

Still other efforts have been disclosed for making tea containing beverages. In European Patent Specification EP 1 026 956 B1, tea containing beverages with cinnamic acid are described.

None of the additional information above describes a beverage with excellent flavor characteristics that comprises a monoprotic antimicrobial agent having a pKa of less than about 2.6 and/or a polyprotic antimicrobial agent having a $pKa_1$ of less than about 2.6 and a $pKa_2$ of less than about 3 or greater than about 6.

SUMMARY OF THE INVENTION

In a first aspect, the present invention is directed to a beverage comprising a monoprotic antimicrobial agent having a pKa of less than about 2.6 and/or a polyprotic antimicrobial agent having a $pKa_1$ of less than about 2.6 and a $pKa_2$ of less than about 3 or greater than about 6 wherein the beverage is substantially free of citric acid.

In a second aspect, the present invention is directed to a method for making a beverage that comprises the above-identified monoprotic antimicrobial agent or polyprotic antimicrobial agent, or both.

Beverage, as used herein, means a liquid, and preferably a non-carbonated liquid, suitable for consumption by humans. Tea-containing beverage means a beverage comprising at least about 0.01% by weight tea solids (for example, from leaf material of *Camellia sinensis*, or *Camellia assamica*) based on total weight of the tea-containing beverage. Microbiologically stable means shelf stable at ambient temperature for at least about eight (8) months after sealing in a bottle or package. Substantially free of citric acid means that the beverage does not comprise citric acid as the primary antimicrobial agent, and therefore, has less than about 0.0030% by weight citric acid, and preferably, from about 0.0020 to less than about 0.0030% by weight, and most preferably, 0.0000% by weight citric acid, based on total weight of the beverage and including all ranges subsumed therein. Primary antimicrobial agent means the predominant additive used to keep the beverage of this invention at a pH from about 2.75 to about 5.0.

DETAILED DESCRIPTION OF THE PREFERRED EMBODIMENTS

The only limitation with respect to the type of beverage that employs the antimicrobial agent or agents described in this invention is that the beverage is suitable for human consumption. Therefore, the beverage can be one which comprises a dairy source, fruit flavor, vegetable, cocoa, coffee, tea or a mixture thereof. In a preferred embodiment, the beverage employing the antimicrobial agent or agents of this invention is made from precursor powders, syrups, high solid content tea-containing liquids or a combination thereof. In a most preferred embodiment, the beverage employing the antimicrobial agent or agents described herein is a tea-containing beverage, and especially, one which is not sweetened (with artificial sweeteners or sugar), not carbonated and prepared from a high solid content tea-containing liquid.

The preferred high solid content tea-containing liquid suitable for use in this invention is made by contacting tea leaf with hot water to produce a tea extract. The resulting tea extract is then filtered until a particulate free supernatent is recovered. The particulate free supernatent can then be clarified by conventional techniques which include centrifugation, decantation and/or filtration to produce the desired high solid content tea-containing liquid. Such a high solid content tea-containing liquid typically has from about 1.0 to about 7.0%, and preferably, from about 2.0 to about 6.0%, and most preferably, from about 3.0 to about 5.0% by weight tea solids, based on total weight of the high solid content tea-containing liquid and including all ranges subsumed therein. The most preferred liquids suitable for use as precursors in this invention are made commercially available by Unilever Bestfoods under the Lipton Tea Brand. A more detailed description of the types of liquids suitable for use in this invention are described in U.S. Pat. No. 6,096,365, the disclosure of which in incorporated herein by reference.

The primary antimicrobial agent used in this invention (to ensure a microbiologically stable and non-sour tasting beverage) should be suitable for use in a beverage composition. Such an agent, when monoprotic, typically has a pKa of less than about 2.6, and preferably, has a pKa from about −7.0 to about 2.5, and most preferably, from about 1.25 to about 2.5, including all ranges subsumed therein. When polyprotic, the antimicrobial agent typically has a $pKa_1$ of less than about 2.6 and a $pKa_2$ of less than about 3 or greater than about 6. Illustrative non-limiting examples of such antimicrobial agents include sodium bisulfate, potassium bisulfate, ammonium bisulfate, hydrochloric acid, phosphoric acid as well as hydrochlorides glycine, alanine, valine, leucine, isoleucine, phenylalanine, asparagine, glytamine, tryptophan, serine, tyrosine, hydroxyproline, cysteine, proline mixtures thereof or the like. It is also within the scope of this invention to employ polypeptides that have backbones and side chains consistent with the above-identified pKa values.

The beverage of the present invention is made by combining, in no particular order, beverage precursor, antimicrobial agent and water (mixing temperatures preferably from about 20° C. to about 30° C.), with the proviso that no solid particulates or precipitate can be detected with the naked eye after the beverage is made. The amount of beverage precursor used is limited only to the extent that the beverage produced is desirable for human consumption. In the case of a beverage which is tea-containing, often, enough beverage precursor is employed to produce a tea-containing beverage comprising at least about 0.01% by weight tea solids based on total weight of the tea-containing beverage. Preferably, however, the tea-containing beverage produced has from about 0.05 to about 1.50%, and most preferably, from about 0.14 to about 0.40% by weight tea solids, based on total weight of the tea-containing beverage and including all ranges subsumed therein.

It is noted that the tea-containing beverage described herein is not limited to any particular type of tea. Therefore, such a tea-containing beverage can be served hot or cold and be classified as white tea, green tea, oolong tea or black tea. A more detailed description of such tea types may be found in Beverage, Technology, Chemistry and Microbiology, by Alan H. Varnam and Jane P. Sutherland, (Aspen Publishers, 1999) as well as in Zhang Guo Zhi Cha Gong Yi, by Zhang Tang Heng, (China Finance Economics Press, 1989), the disclosures of which are incorporated herein by reference.

The amount of antimicrobial agent employed in this invention is such that the final beverage composition has a pH from about 2.75 to about 5.0, and preferably, from about 3.20 to about 4.75, and most preferably, from about 3.5 to about 4.3, including all ranges subsumed therein. Usually, the antimicrobial agent described herein makes up from about 0.005 to about 0.025%, and preferably, from about 0.006 to about 0.010% by weight of the total weight of the beverage.

It has been unexpectedly discovered that beverages made with a monoprotic antimicrobial agent having a pKa of less than about 2.6 and/or a polyprotic antimicrobial agent having a $pKa_1$ of less than about 2.6 and a $pKa_2$ of less than about 3 or greater than about 6 display exceptional flavor characteristics and are not sour, even when not sweetened (i.e., with sugar or with artificial sweeteners). Therefore, the antimicrobial agent or mixture of the same described herein preferably accounts for at least about 60.0%, and most preferably, for at least about 90.0% by weight of the total weight of antimicrobial agent used in the beverage composition.

In an especially preferred embodiment, preservatives like polyphosphate and cinnamic acid (as an additive) are not present in the beverage of this invention since such preservatives can contribute to the sour after taste that has been unexpectedly eliminated from the beverage described herein.

It is within the scope of this invention to add optional additives to the beverage produced, whereby the optional additives include but are not limited to fruit pectin, natural or artificial sweeteners, botanical herbs, spices, natural or artificial flavors, non-dairy-or dairy-based proteins, natural or artificial colorants, like caramel, aroma compounds, gums, emulsifiers or any combination of such optional additives. When such optional additives are employed, they typically make up less than about 25.0% by weight of the total weight of the beverage, and preferably, from about 0.01 to about 20.0% by weight of the total weight of the beverage. Water typically makes up the balance of the beverage of this invention.

In a preferred embodiment, the beverage having improved flavor of this invention is formulated without sugar and artificial sweetener and has sodium bisulfate as the antimicrobial agent. In an especially preferred embodiment, the beverage produced is thermally treated using standard techniques (i.e., heating the beverage from about 80° C. to about 95° C. for about one to two minutes).

There is no limitation with respect to the type of packages the beverage of this invention may be sold in. Typically, the beverage of this invention is packaged glass or plastic (e.g., polyethylene terephthalate) bottles, cans or Tetra Pak packages. In an especially preferred embodiment, the beverages of this invention are package in glass bottles.

The examples which follow are provided to facilitate an understanding of the present invention. The examples are not intended to limit the scope of the claims.

EXAMPLE 1

A carbohydrate free tea-containing beverage (control) was prepared by mixing water, high solids tea-containing liquid (for black tea and as made available by Unilever Bestfoods) and citric acid (as the antimicrobial agent). The tea-containing beverage was mixed at ambient temperature, atmospheric pressure and under moderate shear. The resulting tea-containing beverage had a pH of about 4.0 and contained about 0.16% by weight tea solids.

EXAMPLE 2

A carbohydrate free tea-containing beverage was prepared in a manner similar to the one described in Example 1 except that sodium bisulfate was used as the acidulant in lieu of citric acid. The resulting tea-containing beverage had a pH of about 4.0 and contained about 0.16% by weight tea solids.

EXAMPLE 3

One hundred (100) panelists were asked to compare tea-containing beverages (4 oz. samples) made via the processes similar to those described in Examples 1 and 2. The panelists were asked to rinse their mouths with seltzer and eat a cracker between beverage samples. About 75.0% of the panelists unexpectedly concluded that the carbohydrate free tea-containing beverage made with sodium bisulfate was significantly better tasting than the carbohydrate free tea-containing beverage made with citric acid. Also, about 75.0% of the panelists unexpectedly concluded that the beverage made with sodium bisulfate was less sour than the beverage made with citric acid.

What is claimed is:

1. A tea beverage comprising:
   a) water;
   b) a polyprotic antimicrobial agent having a $pKa_1$ of less than about 2.6 and a $pKa_2$ of less than about 3 or greater than about 6, or both; and
   c) at least about 0.01% by weight tea solids
wherein the beverage is substantially free of citric acid and the polyprotic antimicrobial agent is a hydrochloride of glycine, alanine, valine, isoleucine, phenylalanine, asparagine, glutamine, tryptophan, serine, tyrosine, hydroxyproline, cysteine, proline or mixtures thereof.

2. The beverage according to claim 1 wherein the beverage comprises less than about 0.0030% by weight citric acid.

3. The beverage according to claim 1 wherein the beverage comprises a dairy source, fruit flavor, vegetable, cocoa, coffee, or a mixture thereof.

4. The beverage according to claim 1 wherein the beverage is tea-containing and comprises at least about 0.01% to about 1.5% by weight tea solids.

5. The beverage according to claim 1 wherein the beverage is tea-containing and comprises from about 0.14% to about 0.40% by weight tea solids.

6. The beverage according to claim 1 wherein the beverage is made from a precursor which is a high solid content tea-containing liquid.

7. The beverage according to claim 1 wherein the beverage is not sweetened.

8. The beverage according to claim 1 wherein the beverage is not carbonated.

9. The beverage according to claim 1 wherein the beverage has a pH from about 2.75 to about 5.0.

10. The beverage according to claim 1 wherein the beverage is thermally treated from about 80° C. to about 95° C.

11. The beverage according to claim 1 wherein the beverage is packaged in a glass bottle, plastic bottle, can or Tetra Pak package.

12. The beverage according to claim 1 wherein the beverage comprises less than about 0.0030% by weight citric acid.

13. A method for making a microbiologically stable tea beverage comprising, in no particular order, the steps of:
   a) mixing a beverage precursor with water and acidulant to produce a mixture; and
   b) thermally treating the mixture at a temperature from about 80° C. to about 95° C. to produce the microbiologically stable beverage
wherein the acidulant is polyprotic and has a $pKa_1$ of less than about 2.6 or a $pKa_2$ of less than about 3 or greater than about 6 and the beverage comprises at least about 0.01% by weight tea solids further wherein the acidulant is a hydrochloride of glycine, alanine, valine, isoleucine, phenylalanine, asparagine, glutamine, tryptophan, serine, tyrosine, hydroxyproline, cysteine, proline or mixtures thereof.

14. The method according to claim 13 wherein the beverage is a tea-containing beverage that comprises from about 0.01 to about 1.5% by weight tea solids.

15. The method according to claim 13 wherein the beverage comprises less than about 0.0030% by weight citric acid.

16. The beverage according to claim 1 wherein the polyprotic antimicrobial agent comprises a hydrochloride of phenylalanine, asparagine, glutamine, or a mixture thereof.

17. The method according to claim 13 wherein the polyprotic antimicrobial agent comprises a hydrochloride of phenylalanine, asparagine, glutamine, or a mixture thereof.

* * * * *